(12) United States Patent
Choi

(10) Patent No.: US 12,485,785 B2
(45) Date of Patent: Dec. 2, 2025

(54) ELECTRIC VEHICLE CHARGING CONNECTOR AND ELECTRIC VEHICLE CHARGING ASSEMBLY COMPRISING SAME

(71) Applicant: LS EV KOREA LTD., Gunpo-si (KR)

(72) Inventor: Uk Yeol Choi, Seoul (KR)

(73) Assignee: LS EV KOREA LTD., Gunpo-si (KR)

( * ) Notice: Subject to any disclaimer, the term of this patent is extended or adjusted under 35 U.S.C. 154(b) by 785 days.

(21) Appl. No.: 17/756,492

(22) PCT Filed: Nov. 19, 2020

(86) PCT No.: PCT/KR2020/016366
§ 371 (c)(1),
(2) Date: May 26, 2022

(87) PCT Pub. No.: WO2021/107502
PCT Pub. Date: Jun. 3, 2021

(65) Prior Publication Data
US 2022/0410744 A1 Dec. 29, 2022

(30) Foreign Application Priority Data
Nov. 27, 2019 (KR) .......................... 10-2019-0154579

(51) Int. Cl.
*B60L 53/302* (2019.01)
*B60L 53/18* (2019.01)

(52) U.S. Cl.
CPC ............ *B60L 53/302* (2019.02); *B60L 53/18* (2019.02)

(58) Field of Classification Search
CPC .............................. B60L 53/302; B60L 53/18
(Continued)

(56) References Cited

U.S. PATENT DOCUMENTS

| 12,240,342 B2* | 3/2025 | Fuehrer | ................... B60L 53/16 |
| 2009/0273310 A1* | 11/2009 | Flack | ..................... H01R 24/38 |
| | | | 439/668 |

(Continued)

FOREIGN PATENT DOCUMENTS

| CN | 108701513 A | 10/2018 |
| DE | 102016206300 A1 | 10/2017 |

(Continued)

OTHER PUBLICATIONS

Office Action for related Japanese Application No. 2022-528139; action mailed Jun. 2, 2023; (4 pages).

(Continued)

*Primary Examiner* — Suresh Memula
(74) *Attorney, Agent, or Firm* — K&L Gates LLP

(57) ABSTRACT

The present disclosure relates to an electric vehicle charging connector, which includes a cooling chamber through a cooling fluid passes to cool an electric vehicle charging cable and is configured to connect in the cooling chamber a terminal of the electric vehicle charging connector and a conductor of the electric vehicle charging cable so as to quickly cool heat generated on the terminal of the electric vehicle charging connector and a conductor connection part of the electric vehicle charging cable in the cooling chamber, and to collect the cooling fluid from the cooling chamber to an electric vehicle charger, and an electric vehicle charging assembly.

6 Claims, 8 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2016/0200206 A1 | 7/2016 | Woo et al. | |
| 2016/0221458 A1* | 8/2016 | Lopez | B60L 53/16 |
| 2017/0028862 A1 | 2/2017 | Nagel et al. | |
| 2017/0144558 A1 | 5/2017 | Remisch | |
| 2019/0036254 A1 | 1/2019 | Moseke | |
| 2019/0237218 A1* | 8/2019 | Heyne | H01B 9/006 |
| 2019/0291588 A1* | 9/2019 | Chou | B60L 53/16 |
| 2020/0266578 A1* | 8/2020 | Durse | B60L 53/16 |
| 2020/0282851 A1* | 9/2020 | Sasaridis | H01R 13/50 |
| 2020/0307400 A1* | 10/2020 | de Chazal | H01B 7/426 |
| 2020/0313328 A1* | 10/2020 | Mathews | H01R 13/35 |
| 2020/0338998 A1* | 10/2020 | Wainwright | B60L 58/26 |
| 2020/0343022 A1* | 10/2020 | Tasiopoulos | B60L 53/18 |
| 2020/0361327 A1* | 11/2020 | Heyne | H02J 7/0045 |
| 2020/0391601 A1* | 12/2020 | Maeshiro | B60L 53/16 |

FOREIGN PATENT DOCUMENTS

| | | |
|---|---|---|
| JP | 2018018748 A | 2/2018 |
| JP | 2019133925 A | 8/2019 |
| JP | 2020511915 A | 4/2020 |
| KR | 1020180096259 A | 8/2018 |

OTHER PUBLICATIONS

International Search Report for related International Application No. 10-2019-0154579; action dated Jun. 3, 2021; (6 pages).
Written Opinion for related International Application No. 10-2019-0154579; action dated Jun. 3, 2021; (5 pages).
Extended European Search Report for related European Application No. 20893828.2; action dated Dec. 5, 2023; (9 pages).
Notice of Allowance for related Japanese Application No. 2022-528139; action dated Dec. 1, 2023; (3 pages).

* cited by examiner

ELECTRIC VEHICLE CHARGING CONNECTOR AND ELECTRIC VEHICLE CHARGING ASSEMBLY COMPRISING SAME

CROSS-REFERENCE TO RELATED APPLICATIONS

This application is the National Stage filing under 35 U.S.C. 371 of International Application No. PCT/KR2020/016366, filed on Nov. 19, 2020, which claims the benefit of earlier filing date of and right of priority to Korean Application No. 10-2019-0154579 filed on Nov. 27, 2019, the contents of which are all hereby incorporated by reference herein in their entirety.

FIELD

The present disclosure relates to an electric vehicle charging connector and an electric vehicle charging assembly including the same. Specifically, the present disclosure relates to an electric vehicle charging connector, which includes a cooling chamber through a cooling fluid passes to cool an electric vehicle charging cable and is configured to connect in the cooling chamber a terminal of the electric vehicle charging connector and a conductor of the electric vehicle charging cable so as to quickly cool heat generated on the terminal of the electric vehicle charging connector and a conductor connection part of the electric vehicle charging cable in the cooling chamber, and to collect the cooling fluid from the cooling chamber to an electric vehicle charger, and an electric vehicle charging assembly.

BACKGROUND

With the spread of electric vehicles, electric vehicle chargers have been widely installed. In addition, quick electric vehicle chargers have come into wide use for quick charging in a short time. Unlike slow charging, an output voltage of a quick electric vehicle charger for quick charging is in a range of DC 50V to 450V, a charging current exceeds 100 A, and a time required to charge an electric vehicle through the quick electric vehicle charger to a certain level, e.g., about 80% of a full charge amount, is only thirty to forty minutes. It is expected that a charging current of quick electric vehicle chargers will continuously increase with an increase of battery capacities of electric vehicles and the advancement of charging technology.

Power is supplied to an electric vehicle from a quick electric vehicle charger by connecting an electric vehicle charging cable to a main body of the quick electric vehicle charger, mounting a charging connector into an end of the electric vehicle charging cable, and mounting a connector of the quick electric vehicle charger into an electric vehicle connecting unit of the electric vehicle.

Because a charging current of the quick electric vehicle charger is 100 A or more, heating of the electric vehicle charging cable used to transmit the charging current to the electric vehicle and a charging connector connected to the end of the cable may be a problem.

First, to minimize heat generated in the electric vehicle charging cable, a diameter of a conductor of the electric vehicle charging cable may be increased but generation of heat is difficult to be sufficiently reduced and the weight of the electric vehicle charging cable increases.

Heating of the electric vehicle charging cable is not desirable, because the electric vehicle charging cable may come into contact with a human body when the charging connector is mounted in the connector connection unit or is separated from the connector connection unit and placed in a charger and a user may be injured or feel discomfort or uneasiness.

A method of circulating a cooling fluid in an electric vehicle charging cable to cool heat generated in the electric vehicle charging cable has been introduced. In this method, a conductor of the electric vehicle charging cable is cooled using a cooling fluid.

During charging of an electric vehicle, high heat is generated due to an increase of resistance at an interface between the conductor of the electric vehicle charging cable and a power terminal of the electric vehicle charging connector electrically connected thereto, as in the electric vehicle charging cable, but there is a need to efficiently cool the electric vehicle charging connector using a simplified structure.

SUMMARY

The present disclosure is directed to providing an electric vehicle charging connector, which includes a cooling chamber through a cooling fluid passes to cool an electric vehicle charging cable and is configured to connect in the cooling chamber a terminal of the electric vehicle charging connector and a conductor of the electric vehicle charging cable to quickly cool heat generated at an interface therebetween in the cooling chamber, and to collect the cooling fluid from the cooling chamber to an electric vehicle charger, and an electric vehicle charging assembly.

To achieve these objects, the present disclosure provides an electric vehicle charging assembly comprising: an electric vehicle charging cable comprising: a grounding unit; at least one communication unit; a pair of power units each including a conductor and an insulating layer covering the conductor; a cooling unit configured to cool the conductor and included in the conductor of each of the power units, the cooling unit including a cooling tube and a cooling channel which is included in the cooling tube and in which a cooling fluid flows; and a collection unit including a collection tube in which a collection channel is provided to collect the cooling fluid supplied through the cooling unit; and an electric vehicle charging connector comprising: a pair of power terminals each including a connecting part to be connected to a connector connection unit of an electric vehicle and a conductor connection part into which a conductor of the electric vehicle charging cable is inserted to be connected to the conductor connection part; and a cooling chamber configured to accommodate the conductor connection part of the power terminal, cool heat generated in the conductor connection part by using the cooling fluid flowing through the cooling unit, and collect the cooling fluid by the collection unit.

And the conductor connection part of the power terminal may be exposed to the cooling fluid, which is collected by the cooling unit and supplied to the collection unit, in the cooling chamber.

And the conductor may be exposed in the cooling chamber while the electric vehicle charging cable is stripped.

And the cooling tube in an end of the conductor inserted into the conductor connection part of the power terminal may be cut to be shorter than the end of the conductor.

And in the cooling chamber, an end of the cooling tube of the cooling unit may be bent in a 'L' shape.

And a mounting plate may be provided in the rear of a connector housing, wherein terminals to be connected to the grounding unit and the communication unit may be mounted in the mounting plate.

And in the electric vehicle charging cable, the conductor connected to the power terminal may have a self-twist and helically wound structure in which multiple self-twisted conductors formed by twisting multiple strands in a twist pitch are helically wound in a certain winding pitch.

To achieve these objects, the present disclosure provides an electric vehicle charging connector, which supplies power to charge an electric vehicle when detachably mounted into a connector connection unit of the electric vehicle while being mounted into an electric vehicle charging cable, the electric vehicle charging connector may comprise a pair of power terminals each including a connecting part to be connected to the connector connection unit and a connector connection part into which a conductor of the electric vehicle charging cable is inserted to be connected to the connector connection part; and a cooling chamber configured to accommodate the conductor connection part of each of the pair of power terminals, directly cool heat generated in the conductor connection part by using a cooling fluid flowing through a cooling unit, and collect the cooling fluid by a collection unit.

And the conductor connection part of each of the pair of power terminals and the conductor of the electric vehicle charging cable may be exposed to the cooling fluid in the cooling chamber.

According to the present disclosure, an electric vehicle charging connector may include a cooling chamber through a cooling fluid passes to cool an electric vehicle charging cable, a terminal of the electric vehicle charging connector and a conductor of the electric vehicle charging cable may be connected in the cooling chamber to quickly cool heat generated at an interface between the terminal of the electric vehicle charging connector and the conductor of the electric vehicle charging cable in the cooling chamber, and the cooling fluid may be collected from the cooling chamber to an electric vehicle charger, thereby cooling the electric vehicle charging cable and the electric vehicle charging connector together.

In addition, in the electric vehicle charging connector and the electric vehicle charging assembly including the same according to the present disclosure, the entire electric vehicle charging assembly can be efficiently cooled using the cooling fluid to prevent damage to a product, prevent a safety accident from occurring due to overheating of a connector connection unit or the electric vehicle charging cable, and improve product reliability.

BRIEF SUMMARY OF THE DISCLOSURE

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

In the following description, an electric vehicle ev is a vehicle that drives an electric motor using electric energy charged in a battery of the vehicle and uses a driving force of the electric motor as power of the vehicle, and more particularly, a plug-in electric vehicle (PEV).

However, the electric vehicle ev should not be understood as being limited to a general car running on the road and should be understood as a concept including a cart, a working vehicle, a motorcycle, etc., as well as the general car running on the road.

Figure 1:
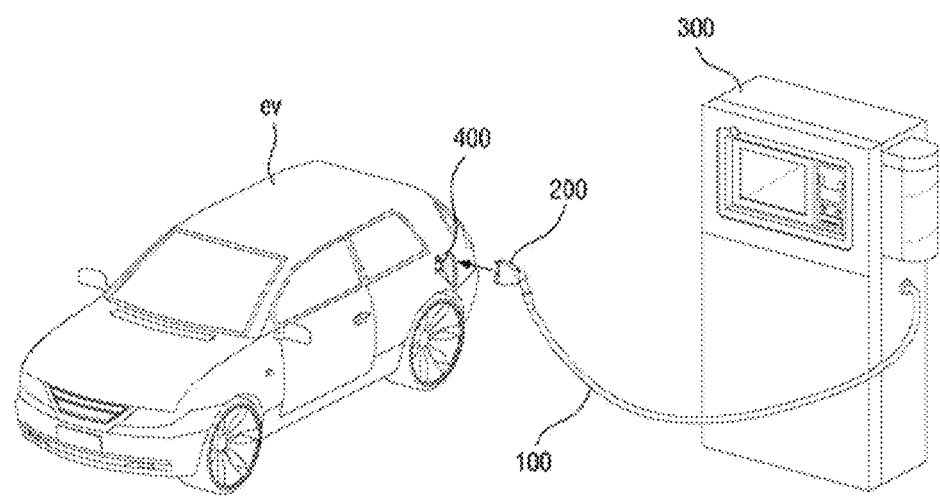
FIG. 1 illustrates an electric vehicle charging system that includes an electric vehicle charger, an electric vehicle charging assembly, and an electric vehicle ev.

FIG. 1 illustrates an electric vehicle charging system that includes an electric vehicle charger, an electric vehicle charging assembly, and an electric vehicle ev.

An electric vehicle charger 300 is connected to an electric vehicle charging connector 200 through an electric vehicle charging cable 100 to supply power to the electric vehicle ev. The electric vehicle charging connector 200 is provided at an end of the electric vehicle charging cable 100.

The electric vehicle charging connector 200 may be mounted into a connector connection unit 400 of the electric vehicle ev to supply power. Charging of the electric vehicle ev may be completed in a short time by using a quick electric vehicle charger.

During quick charging of the electric vehicle ev, a conductor of the electric vehicle charging cable 100 and a power terminal of the electric vehicle charging connector 200 to which the connector is connected may be overheated due to a high current capacity.

In a method of the related art, a cooling fluid is injected into the electric vehicle charging cable 100 to cool heat generated in the electric vehicle charging cable 100 but the power terminal of the electric vehicle charging connector 200 cannot be sufficiently cooled.

Figure 2:
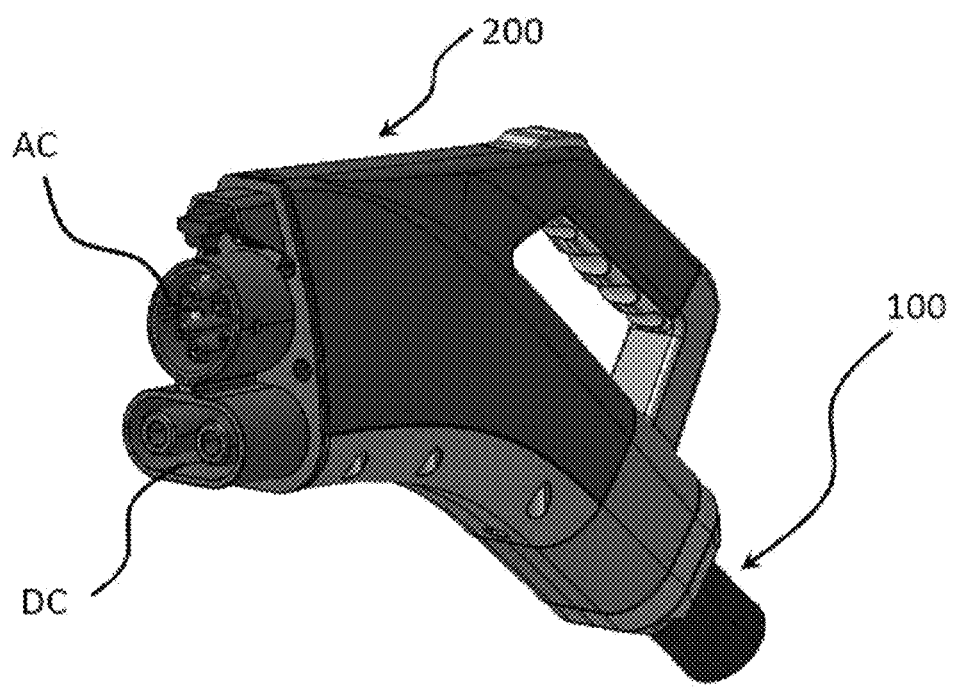
FIG. 2 is a perspective view of an electric vehicle charging assembly that includes an electric vehicle charging cable included in an electric vehicle and an electric vehicle charging connector configured to be connected to the electric vehicle charging cable.

Accordingly, an electric vehicle charging assembly 1000 of the present disclosure includes a heat sink in the connector to efficiently cool the electric vehicle charging connector 200, and a cooling unit at a center of each of a pair of power units of the electric vehicle charging cable 100 to cool both the power terminal of the electric vehicle charging connector 200 and the connector of the electric vehicle charging cable 100. FIG. 2 is a perspective view of an electric vehicle charging assembly that includes an electric vehicle charging cable included in an electric vehicle and an electric vehicle charging connector configured to be connected to the electric vehicle charging cable.

The electric vehicle charging connector 200 is applicable to the 'CHAdeMO' method used in Japan or the Renault '3-phase AC' method, as well as the combo ('TYPE1') method used in the USA and Europe and determined as a future unification standard.

As illustrated in FIG. 2, the electric vehicle charging connector 200 is mounted into an end of the electric vehicle charging cable 100 of the present disclosure and configured to be detachably mounted in the connector connection unit 400 of the electric vehicle ev.

A connector employing the 'combo (TYPE1)' method may be a combination of AC or DC connectors each having a slow charger 201 and a quick charger 203 to support both slow charging and quick charging.

A product may be damaged or a user may get burned, i.e., a safety accident may occur, due to heat generated in the conductor of the electric vehicle charging cable 100 due to a high current during quick charging, and particularly, overheating of a power terminal electrically connected to the conductor.

Accordingly, in the present disclosure, a structure for efficiently cooling both an electric vehicle charging cable and an electric vehicle charging connector using a cooling fluid is employed.

Figure 3:
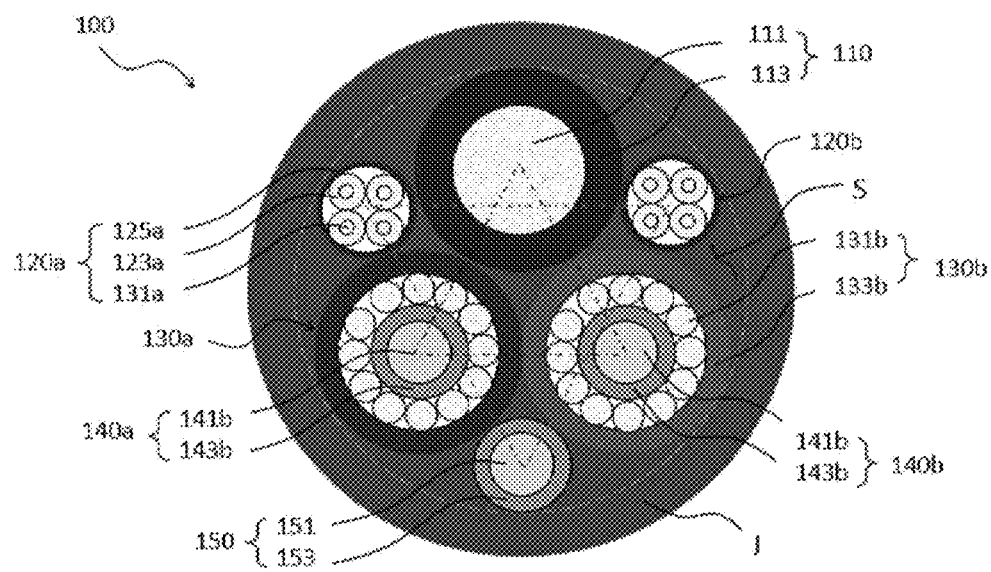
FIG. 3 is a cross-sectional view of an electric vehicle charging cable of an electric vehicle charging assembly according to the present disclosure.

FIG. 3 is a cross-sectional view of an electric vehicle charging cable of an electric vehicle charging assembly according to the present disclosure.

A structure of an electric vehicle charging cable 100 will be described in detail below.

As shown in FIG. 3, the electric vehicle charging cable 100 includes: one grounding unit 110; at least one communication unit 120; a pair of power units 130a and 130b including conductors 131a and 131b and insulating layers 133a and 133b covering the conductors 131a and 131b; cooling units 140a and 140b configured to cool the conductors 131a and 131b, included in the conductors 131a and 131b of the power units 130a and 130b, and including cooling tubes 143a and 143b and cooling channels 141a and 141b, which are provided in the cooling tubes 143a and 143b and in which a cooling fluid flows; and a collection unit 150 including a collection tube 153 in which a collection channel 151 is provided to collect the cooling fluid supplied through the cooling units 140a and 140b.

The power units 130a and 130b of the electric vehicle charging cable 100, which supply power, are likely to be overheated during charging of an electric vehicle, and in the electric vehicle charging cable 100 of the present disclosure, the pair of cooling units 140a and 140b are respectively included in the pair of power units 130a and 130b and the cooling fluid is introduced into the cooling channels 141a and 141b of the cooling units 140a and 140b to cool the power terminals 130a and 130b to a certain degree.

A method of cooling the conductors 131a and 131b in the pair of power units 130a and 130b by using the cooling fluid supplied from the electric vehicle charger 300 of FIG. 1 through the cooling tubes 143a and 143b, changing a channel to cause the cooling fluid to flow to the collection unit 150, collecting and cooling the cooling fluid by the electric vehicle charger 300, and supplying the cooling unit again may be employed by the cooling units 140a and 140b included in the pair of power units 130a and 130b.

Thus, a cooling device for re-cooling the cooling fluid and a pumping device for circulating the cooling fluid may be provided inside or outside the electric vehicle charger 300.

Only a conductor with an insulating layer may be withdrawn to a charger power supplier (not shown), and the cooling fluid flowing through the cooling tubes 143a and 143b may be re-cooled and pumped by the cooling device and the pumping device to form a circulation channel.

As shown in FIG. 3, the components of the electric vehicle charging cable 100 are only examples, and a total diameter of the cable may be reduced by adjusting the positions of the components such that a triangle connecting the centers of the pair of power units 130a and 130b and the grounding unit 110 and a triangle connecting the centers of the pair of communication units 120a and 120b and the collection unit 150 are regular triangles, but the present disclosure is not limited to the above structure.

A connection structure of an electric vehicle charging connector and an electric vehicle charging cable of the electric vehicle charging assembly 1000 will be described in detail below.

Figure 4:
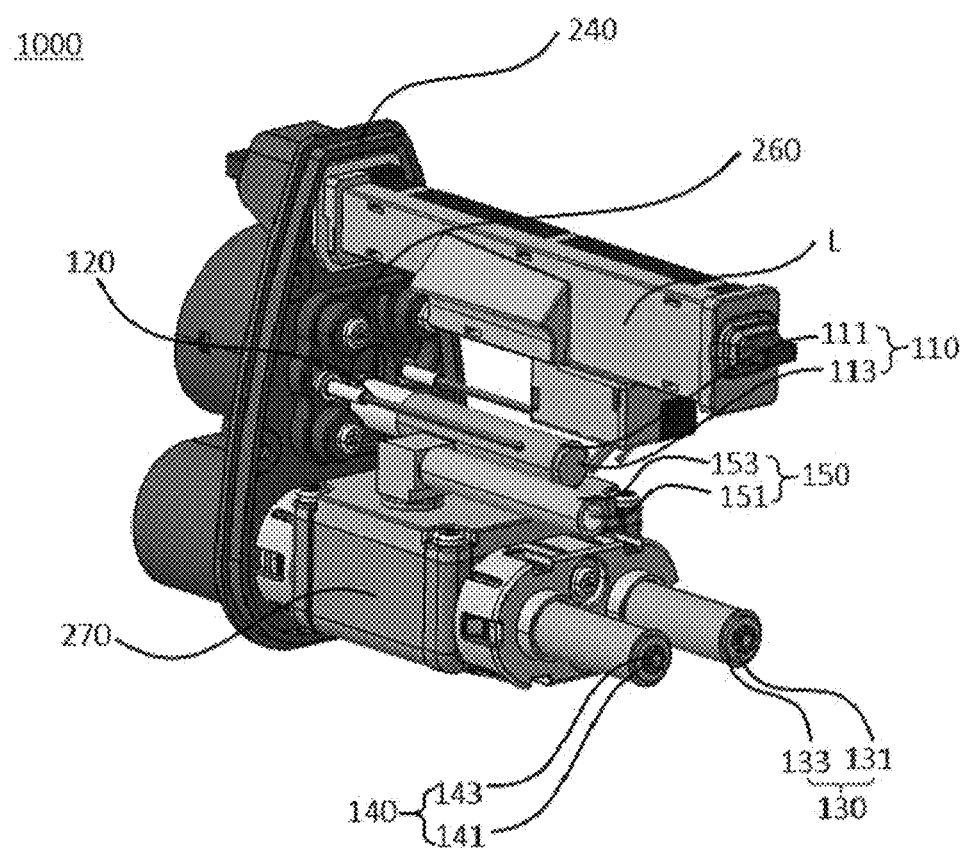
FIG. 4 is a rear perspective view of an electric vehicle charging assembly from which a housing is removed.
Figure 5:
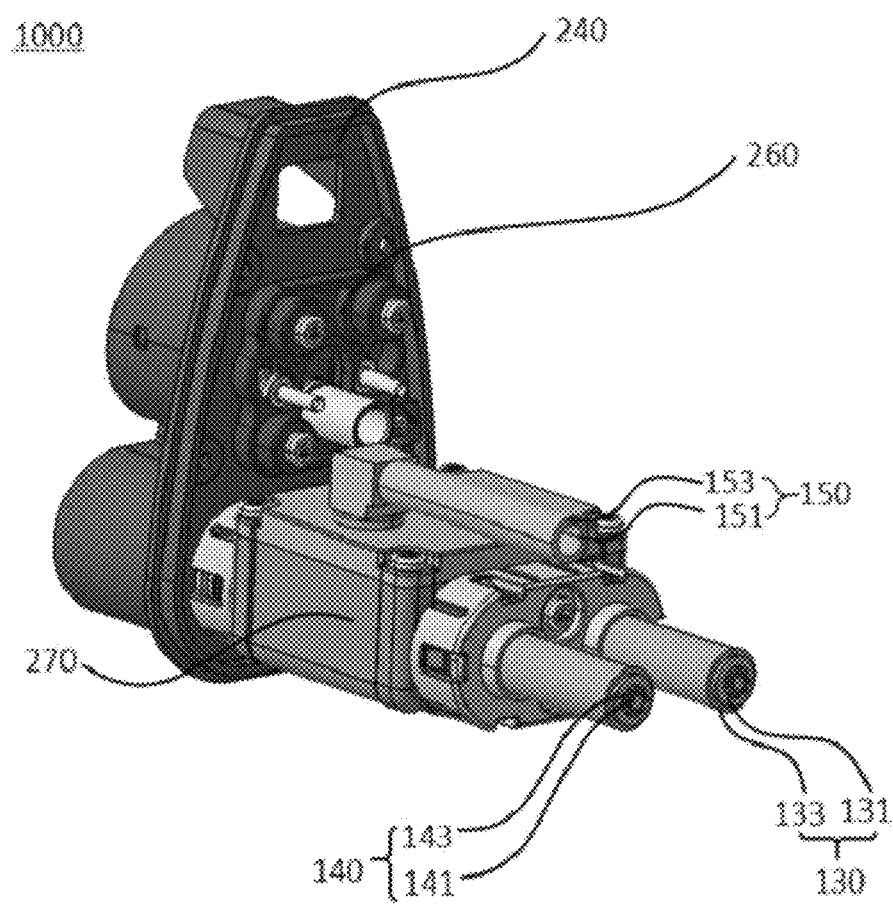
FIG. 5 illustrates key components of a cooling structure of the electric vehicle charging assembly of FIG. 4.

FIG. 4 is a rear perspective view of an electric vehicle charging assembly from which a housing is removed. FIG. 5 illustrates key components of a cooling structure of the electric vehicle charging assembly of FIG. 4.

In the electric vehicle charging assembly 1000, the electric vehicle charging cable 100 may be connected to the rear of the electric vehicle charging connector 200 and the connector connection unit 400 (see FIG. 1) may be detachably connected to a front charging part of the electric vehicle charging connector 200 to supply power to the electric vehicle ev and transmit or receive a control signal.

The electric vehicle charging connector 200 of the present disclosure may include a locking unit L for locking when connected to a connector connection unit of an electric vehicle, and the locking unit L may include a locking means for enabling selective locking, a physical switch for selectively canceling a locking state, a control switch for controlling a charging operation, or the like.

Here, the electric vehicle charging connector 200 may include: a pair of power terminals 230 including a connecting part 232 to be connected to the connector connection unit 400 of the electric vehicle ev and a conductor connection part 231 into which the conductor 131 of the electric vehicle charging cable 100 is inserted to be connected thereto; and a cooling chamber 270 configured to accommodate the conductor connection part 231 of each of the power units 230, cool heat generated in the conductor connection part 231 using a cooling fluid flowing through the cooling unit 140, and supply the cooling fluid to the collection unit.

As shown in FIG. 4, an interlock system including an interlock terminal and the communication unit 120 may be mounted in the electric vehicle charging connector 200 to prevent sparks, etc. from occurring when a connector is mounted or separated.

A connector housing 240 may be formed of an insulating resin material such as plastic, protect the inner components of the electric vehicle charging connector 200, and form an exterior of the electric vehicle charging connector 200. Here, it is preferable that the function, shape and connection specifications of the connector housing 240 be set to satisfy certain design specifications of the connector connection unit 400, e.g., IEC 62196-3 standard.

A mounting plate 260 may be provided in the rear of the connecting housing 240 and formed of a plastic material to be used as a place in which terminals for connection to the grounding unit 110 and the communication unit 120 of the electric vehicle charging cable 100 and the inner components such as the cooling chamber 270 are mounted.

The power terminal 230 (see FIG. 7) of the electric vehicle charging connector may include a connecting part 232 to be connected to the connector connection unit, and a pair of conductor connection parts 231a and 231b which are located opposite to the connecting part 232 and into which the pair of power units 130a and 130b of the electric vehicle charging cable 100 are inserted to be electrically connected thereto.

Here, the conductors 131a and 131b electrically connected to the conductor connection parts 231a and 231b may be formed of a metal having high electric conductivity, e.g., tin, copper, aluminum, or an alloy thereof, and preferably, annealed copper wire, and may have a self-twist and helically wound structure in which several twisted conductors formed by twisting multiple strands in a certain twist pitch are wound in a certain pitch.

A tape for covering the multiple strands to maintain the twisted or wound state is not necessary owing to the self-twist and helically wound structure, thereby preventing an increase of external diameters of the electric vehicle charging cable 100 or the conductor connection parts 231a and 231b or deterioration of the flexibility thereof.

The conductor connection parts 231a and 231b are parts to which the conductors 131a and 131b are connected in a longitudinal direction and thus may be formed of a metal having high electric conductivity, e.g., copper, aluminum or an alloy thereof.

In order to increase an electric contact area with the conductors 131a and 131b, the conductor connection parts 231a and 231b may be formed in a cylindrical pipe structure covering the outer circumferential surfaces of the conductors 131a and 131b when the conductors 131a and 131b are formed in a bar shape.

An interface between the conductor connection parts 231a and 231b of the electric vehicle charging connector and the conductors 131a and 131b of the electric vehicle charging cable 100 may be most overheated during charging of an electric vehicle.

Thus, the electric vehicle charging connector 200 of the present disclosure employs a cooling structure of cooling heat generated in the conductor connection part 231 of the power terminal 230 by using the cooling fluid flowing through the cooling unit 140 of the electric vehicle charging cable to cool the electric vehicle charging cable 100 and the electric vehicle charging connector 200 together by using the cooling fluid supplied from an electric vehicle charger.

The electric vehicle charging connector 200 of the present disclosure may include the cooling chamber 270 therein to cool heat generated in the conductor connection part 231 of the power terminal 230 by using the cooling fluid flowing through the cooling unit 140 and collecting the cooling fluid by the collection unit 150.

The cooling chamber 270 of the electric vehicle charging connector 200 may be configured to accommodate the conductor connection part 231 of the power terminal 230 to be connected to a conductor of a power unit of an electric vehicle charging cable.

Through repetitive experiments, it was confirmed that heat generated in the conductor connection part can be sufficiently cooled by the cooling fluid supplied to the cooling chamber 270 even after the cooling fluid was used to cool a power unit of an electric vehicle charging cable.

The connecting part 233 of the power terminal 230 may be exposed forward while passing through the cooling chamber 270, and the conductor connection part 231 of the power terminal 230 connected to a conductor of a power unit of an electric vehicle charging cable may be disposed in the cooling chamber 270 and thus may be quickly cooled by the cooling chamber flowing in the cooling chamber 270 and collected by a collection unit.

The cooling tube 143 of the cooling unit of the electric vehicle charging cable may be exposed in the cooling chamber 270, so that the cooling fluid may circulate within the cooling chamber 270 and thereafter be collected by the cooling unit 150.

The collection unit 150 may be connected at a right angle to an upper portion of the cooling chamber 270. The cooling fluid collected by the collection unit 150 and delivered to the outside may be collected again, re-cooled and pumped in the electric vehicle charger 300 (see FIG. 1).

Figure 6:
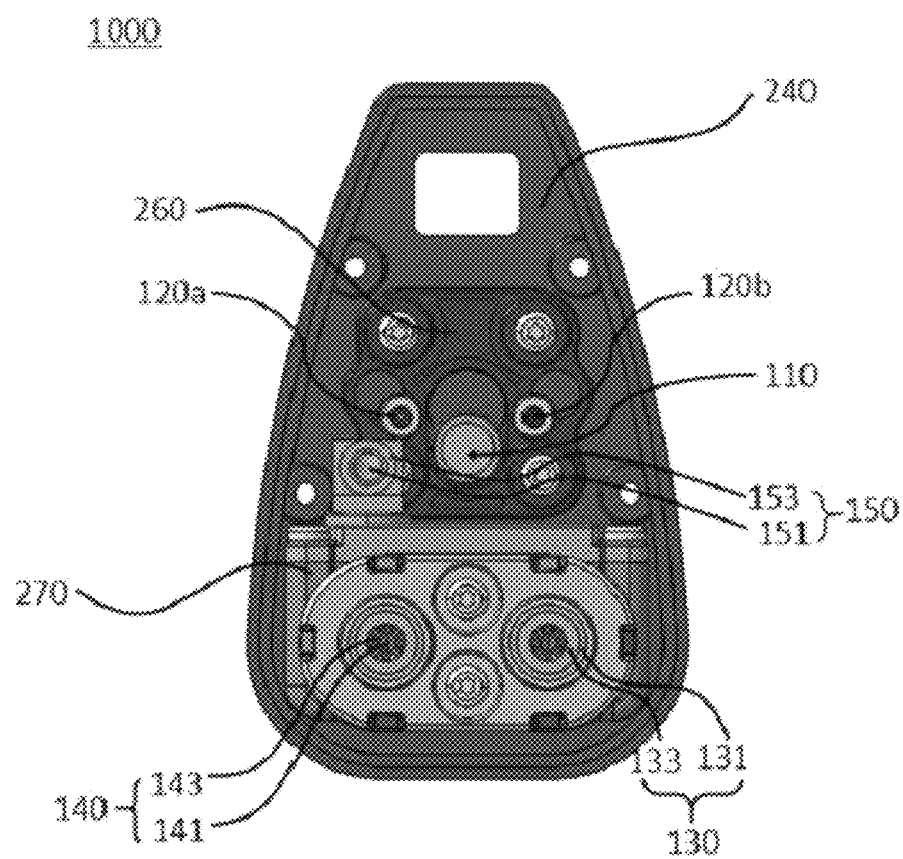
FIG. 6 is a front view of the electric vehicle charging assembly of FIG. 5 when viewed from the rear.

FIG. 6 is a front view of the electric vehicle charging assembly of FIG. 5 when viewed from the rear.

Referring to FIG. 6, the mounting plate 260 may be mounted in the rear of the connector housing 240, and the grounding unit 110 and the pair of communication units 120a and 120b of the electric vehicle charging cable may be connected to terminals of the mounting plate 260.

The pair of power units are loaded into the cooling chamber to be connected to the power terminal of the connector as described above.

As described above, the cooling chamber 270 may be mounted while accommodating the power units 231 of the pair of power terminals 230, and when the cooling fluid is injected into the cooling chamber 270 along the cooling channel 141, the cooling fluid may flow to the outside along the collection channel 151 exposed outside the cooling chamber 270 after circulation.

Figure 7:
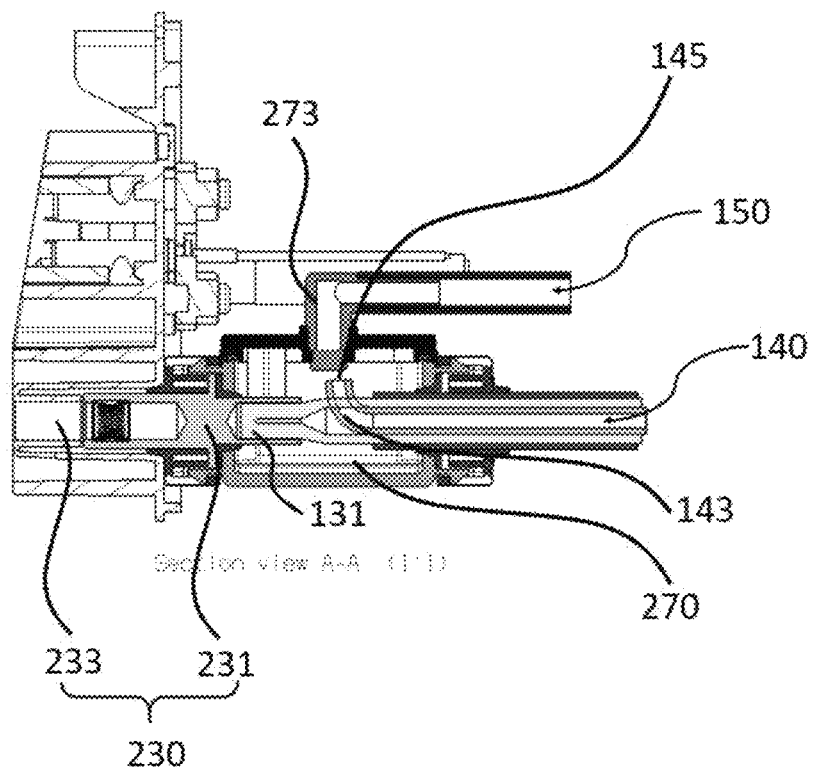
FIG. 7 is a side cross-sectional view of the electric vehicle charging assembly of FIG. 5.
Figure 8:
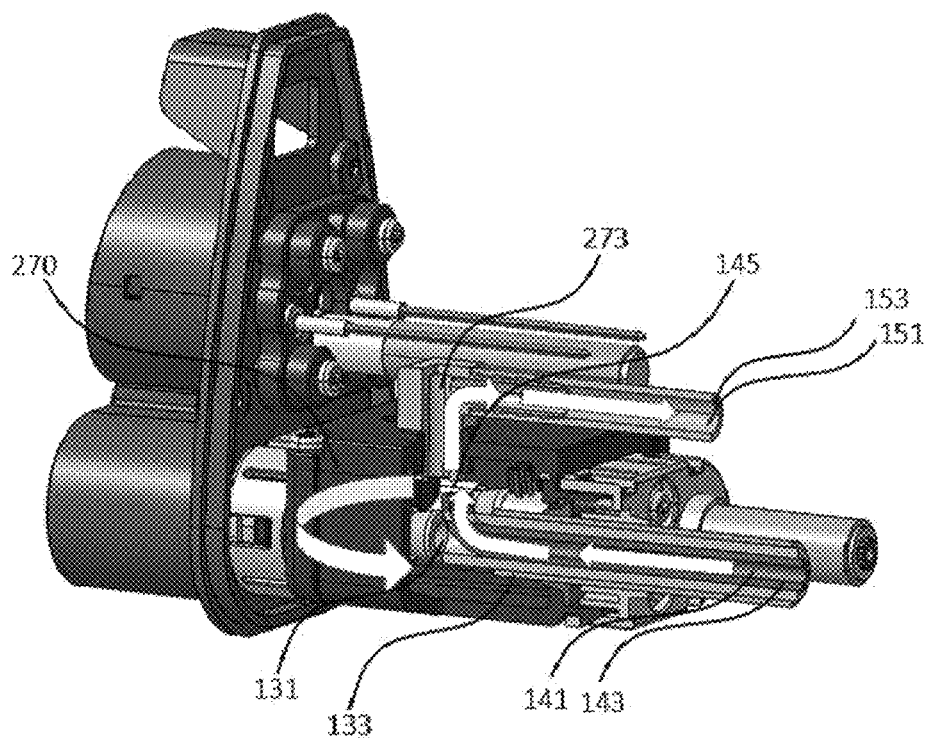
FIG. 8 is a perspective view of an electric vehicle charging assembly according to the present disclosure, in which a channel of a cooling fluid is shown.

FIG. 7 is a side cross-sectional view of the electric vehicle charging assembly of FIG. 5. FIG. 8 is a perspective view of an electric vehicle charging assembly according to the present disclosure, in which a channel of a cooling fluid is shown.

In the related art, even when a cooling fluid is introduced into a cooling chamber, the cooling fluid does not cool components, such as a terminal or a conductor, while in direct contact therewith, and a cooling channel is designed to be near the components to indirectly cool the components by cooling the vicinity of the components, thereby limiting cooling performance.

In contrast, in the electric vehicle charging assembly 1000 of the present disclosure, the conductor and the conductor connection part 231 may be directly cooled by immersing them in the cooling fluid in the cooling chamber 270, thereby greatly improving cooling efficiency and performance.

The cooling fluid is brought in direct contact with the conductor configured to supply power, and thus, an insulating cooling fluid may be used but the cooling fluid need not necessarily have an insulating property.

As shown in FIG. 7, the cooling tubes 143 of the cooling units 140 may be buried in parallel in a cable in a longitudinal direction, bent in an "L" shape and exposed in the cooling chamber 270 at a position outside the conductor 131 of the cable, and to deliver the cooling fluid into the cooling tubes 143 to the collection unit 150, but when the cooling tubes 143 of the cooling units 140 consist of strands, the cooling tubes 143 may be cut in the conductor 131, so that the cooling fluid may flow to the outside of the conductor 131 and thereafter be collected in the cooling chamber 270.

In the latter case, a method of cutting the cooling tube 143 in an end of the conductor 131 inserted into the conductor connection part 231 to be shorter than an end of the conductor 131 may be used.

The collection unit 150 may be connected to the cooling chamber 270 through a channel change valve 273 on an upper surface of the cooling chamber 270.

Accordingly, some of cooling fluids flowing in parallel along the cooling channels 141 in the cooling tubes 143 may be collected on an "L"-shaped end 145 of the cooling tube 143 along the collection channel 151, and the remaining cooling fluid may circulate in a turbulent flow in the cooling chamber 270, thereby cooling the conductor 131 and the conductor connection part 231.

The cable 131 of the electric vehicle charging cable connected to the conductor connection part 231 may be stripped in the cooling chamber 270 to be connected in an exposed state to the power terminal.

As shown in FIG. 8 showing a flow of the channel of the cooling fluid, the cooling fluid supplied from the electric vehicle charger 300 (see FIG. 1) through the pair of cooling tubes 143 may cool the conductor in the conductor of the power unit, flow out of the end 145 of the cooling tube, some of the flowing cooling fluid may cool the conductor connection part while circulating in the cooling chamber 270, and the remaining cooling fluid may be collected by the collection unit, thereby achieving high cooling performance.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An electric vehicle charging assembly comprising:
an electric vehicle charging cable comprising: a grounding unit; at least one communication unit; a pair of power units each including a conductor and an insulating layer covering the conductor; a cooling unit configured to cool the conductor and included in the conductor of each of the power units, the cooling unit including a cooling tube and a cooling channel which is included in the cooling tube and in which a cooling fluid flows; and a collection unit including a collection tube in which a collection channel is provided to collect the cooling fluid supplied through the cooling unit; and
an electric vehicle charging connector comprising: a pair of power terminals each including a connecting part to be connected to a connector connection unit of an electric vehicle and a conductor connection part into which a conductor of the electric vehicle charging cable is inserted to be connected to the conductor connection part; and a cooling chamber configured to accommodate the conductor connection part of the power terminal, cool heat generated in the conductor connection part by using the cooling fluid flowing through the cooling unit, and collect the cooling fluid by the collection unit,
wherein the conductor connection part of the power terminal and the stripped conductor of the electric vehicle charging cable are directly exposed to the cooling fluid, which is collected by the cooling unit and supplied to the collection unit, in the cooling chamber.

2. The electric vehicle charging assembly of claim 1, wherein the cooling tube in an end of the conductor inserted into the conductor connection part of the power terminal is cut to be shorter than the end of the conductor.

3. The electric vehicle charging assembly of claim 1, wherein, in the cooling chamber, an end of the cooling tube of the cooling unit is bent in a 'L' shape.

4. The electric vehicle charging assembly of claim 1, wherein a mounting plate is provided in the rear of a connector housing, wherein terminals to be connected to the grounding unit and the communication unit are mounted in the mounting plate.

5. The electric vehicle charging assembly of claim 1, wherein, in the electric vehicle charging cable, the conductor connected to the power terminal has a self-twist and helically wound structure in which multiple self-twisted conductors formed by twisting multiple strands in a twist pitch are helically wound in a certain winding pitch.

6. An electric vehicle charging connector, which supplies power to charge an electric vehicle when detachably mounted into a connector connection unit of the electric vehicle while being mounted into an electric vehicle charging cable, the electric vehicle charging connector comprising:
a pair of power terminals each including a connecting part to be connected to the connector connection unit and a connector connection part into which a conductor of the electric vehicle charging cable is inserted to be connected to the connector connection part; and
a cooling chamber configured to accommodate the conductor connection part of each of the pair of power terminals, directly cool heat generated in the conductor connection part by using a cooling fluid flowing through a cooling unit of the electric vehicle charging cable, and collect the cooling fluid by a collection unit of the electric vehicle charging cable,
wherein the conductor connection part of the power terminal and the stripped conductor of the electric vehicle charging cable are directly exposed to the cooling fluid, which is collected by the cooling unit and supplied to the collection unit, in the cooling chamber.

* * * * *